(12) United States Patent
Paul et al.

(10) Patent No.: US 10,183,225 B2
(45) Date of Patent: Jan. 22, 2019

(54) PORTABLE COMPUTER GAMING CONTROL STATION

(71) Applicant: Corsair Memory, Inc., Fremont, CA (US)

(72) Inventors: Andy Paul, Fremont, CA (US); Dean Depay, Fremont, CA (US); Ric Poon, Fremont, CA (US); Michal Nowicki, Fremont, CA (US); Sherman Wei, Fremont, CA (US)

(73) Assignee: Corsair Memory, Inc., Fremont, CA (US)

( * ) Notice: Subject to any disclaimer, the term of this patent is extended or adjusted under 35 U.S.C. 154(b) by 0 days.

(21) Appl. No.: 15/399,719

(22) Filed: Jan. 5, 2017

(65) Prior Publication Data

US 2017/0192466 A1 Jul. 6, 2017

Related U.S. Application Data

(60) Provisional application No. 62/275,069, filed on Jan. 5, 2016.

(51) Int. Cl.
*A63F 13/20* (2014.01)
*A63F 13/98* (2014.01)
*G06F 1/16* (2006.01)
*G06F 3/02* (2006.01)
*G06F 3/039* (2013.01)

(52) U.S. Cl.
CPC ............ *A63F 13/98* (2014.09); *G06F 1/1632* (2013.01); *G06F 3/02* (2013.01); *G06F 3/039* (2013.01)

(58) Field of Classification Search
CPC ................................. A63F 13/20; A47B 21/00
See application file for complete search history.

(56) References Cited

U.S. PATENT DOCUMENTS

| 2006/0017698 | A1* | 1/2006 | Hull | ......................... G06F 3/02 345/168 |
| 2014/0331900 | A1* | 11/2014 | Schweiter, Jr. | ......... G06F 3/039 108/50.02 |

\* cited by examiner

*Primary Examiner* — Omkar Deodhar

(57) ABSTRACT

A portable gaming control station for holding a keyboard and mouse is disclosed, according to certain embodiments. The portable gaming control station comprises a rectangular tub with a mouse mat area, a keyboard compartment, a cable management compartment, and a built-in powered USB hub, according to certain embodiments.

6 Claims, 5 Drawing Sheets

PORTABLE COMPUTER GAMING CONTROL STATION

CROSS-REFERENCE TO RELATED APPLICATIONS

The present application claims the benefit of U.S. Provisional Patent Application Ser. No. 62/275,069, filed Jan. 5, 2016 and entitled "Portable Computer Gaming Control Station," which is hereby incorporated by reference in its entirety.

TECHNICAL FIELD

The present invention is directed to accessories for computers, and more specifically to aspects of a portable gaming control station.

BRIEF DESCRIPTION OF THE DRAWINGS

For a better understanding of the various embodiments of the invention, reference should be made to the description of embodiments below, in conjunction with the following drawings in which like reference numerals refer to corresponding parts throughout the figures.

DETAILED DESCRIPTION

Figure 1:
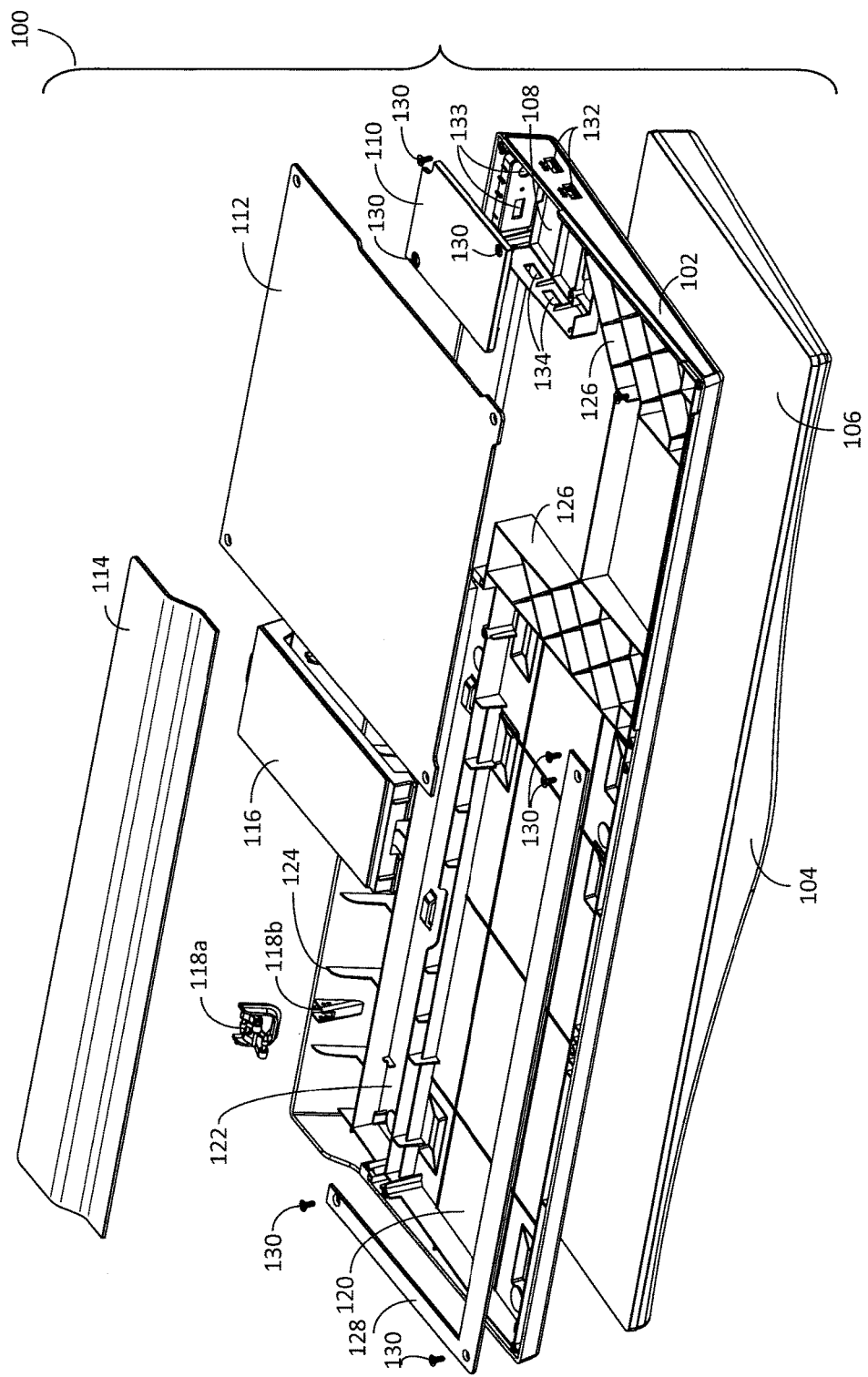
FIG. 1 illustrates a top-front-right perspective exploded view of a portable gaming control station, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a portable gaming control station comprises a rectangular tub with a mouse mat area, a keyboard compartment (also referred to as a "keyboard dock"), a cable management compartment, and a built-in powered USB hub.

Further, such a portable gaming station includes an ergonomically designed underside support structure (made of memory foam or other suitable material) for user comfort, according to certain embodiments. According to certain embodiments, the ergonomically designed underside support structure is removable.

The built-in powered USB hub is for connecting the keyboard, mouse, headset, game controllers and flash drives to an associated computer that the user is using. According to certain embodiments, the portable gaming control station is connected to the user's computer via a composite power and USB cable. According to certain portable gaming station includes a battery charger for charging a smart phone or tablet.

According to certain embodiments, the portable gaming control station allows a user to conveniently use a keyboard and mouse in a living room environment. For example, the user may desire to play a computer game while seated on a couch in the living room. The user can use the portable gaming station to hold/support the keyboard and mouse while comfortably placing the portable gaming station on the user's lap. The ergonomically designed underside support structure of the portable gaming station affords comfort to the user while keeping the portable gaming control station positioned stably on the user's lap. The user may remove the ergonomically designed underside support structure when placing the portable gaming station on a flat surface (e.g., at a desk or table top). Thus, the user can continue to use the keyboard and mouse that is set up in the portable gaming station at a desk without having to remove the keyboard and mouse from the portable gaming station when the user is at her/his desk or at a table top.

FIG. 1 illustrates a top-front-right perspective exploded view of a portable gaming control station 100, according to certain embodiments. The exploded view of FIG. 1 shows the intended assembly of the components of the portable gaming control station 100, according to certain embodiments. FIG. 1 shows a tub 102, an ergonomically designed underside support structure 104 attached to a mounting plate 106. The mounting plate 106 can easily attach to tub 102 with magnets, for example. The magnets also allow for easy detachment of the mounting plate 106/underside support structure 104 from tub 102 in order to place the portable gaming station 100 on a flat surface (e.g., at a desk or table top). According to certain embodiment, the ergonomically designed underside support structure 104 is made of a material such as memory foam and is ergonomically shaped to allow the portable gaming station to be positioned stably and comfortably on the user's lap. For example, the underside support structure 104 can be convex shaped (104a shown in FIG. 5) at the regions where the underside support structure 104 rests on the thighs of the user. The embodiments are not restricted to using memory foam. Other suitable materials may be used so as to allow the portable gaming station to be positioned stably and comfortably on the user's lap. Non-limiting examples of material that can be used to make underside support structure 104 include, gel, ergobeads, expanded polystyrene beads, styrofoam, and the like. The type of material used to make the underside support structure 104 may vary from implementation to implementation.

Tub 102 includes a keyboard compartment 120 for holding a keyboard (not shown) that a user can use to communicate with a computer (for example, the user can use the keyboard to play a game on the computer). Tub 102 includes a cable storage compartment 122 for storing a keyboard cable of the user's keyboard and a mouse cable of the user's mouse if the keyboard and mouse are wired devices (the user may also choose to use wireless keyboard and/or a wireless mouse). Further, tub 102 includes an optional battery compartment 109 and PCB compartment 108 (battery and PCB not shown), trim piece 128 (and screws 130 for attaching the trim piece 128 to tub 102), and stiffeners 124, 126. The cable storage compartment 122 runs the length of tub 102 up to the location where a PCB compartment is located as shown in FIG. 1. The optional battery compartment is for installing a battery in the case of wireless embodiments of the portable gaming control station.

Portable gaming control station 100 includes: 1) PCB compartment plate 110 for covering the PCB compartment 108 using screws 130, for example, 2) a mouse plate 112 (that provides a large mouse pad area for the user's mouse) that can be attached to the tub 102 using screws 130, for example, 3) a hinged cover 114 (and associated hinges 118a, 118b) to cover cable storage compartment 122, and 4) a filler plate 116. According to certain embodiments, the hinged cover 114 can extend along the length of tub 102 up to the location of the mouse plate 112, as shown in FIG. 1. According to certain other embodiments, the hinged cover can extend along the entire length of tub 102. In such embodiments, where the hinged cover extends along the entire length of tub 102, the width of the mouse plate would be shorter in order to accommodate the hinged cover. To explain, in such embodiments, the mouse plate would not extend over the cable storage compartment 122.

Further, the user has the option of removing filler plate 116 if keyboard compartment 120 is to hold an extended keyboard. This allows the user the flexibility of using various types of keyboards. The PCB compartment 108 is for housing a PCB hub. Thus, the PCB compartment 108 includes: 1) USB port openings 132 to accommodate USB connections including a fast-charging USB port, 2) connector openings 134 to accommodate cable connectors for connecting the keyboard and mouse cables, and 3) connector openings 133 for connecting the portable gaming control station 100 the power supply and the PCB hub to the associated computer that the user is using in conjunction with the keyboard and mouse on the portable gaming control station. The user can use the USB port to connect to ca flash drive, for example. The user can use the fast-charging USB port in the portable gaming control station to conveniently charge the user's smart phone or tablet. FIG. 1 shows only two USB port openings but the portable gaming control station may include more than two USB port openings.

Figure 2:
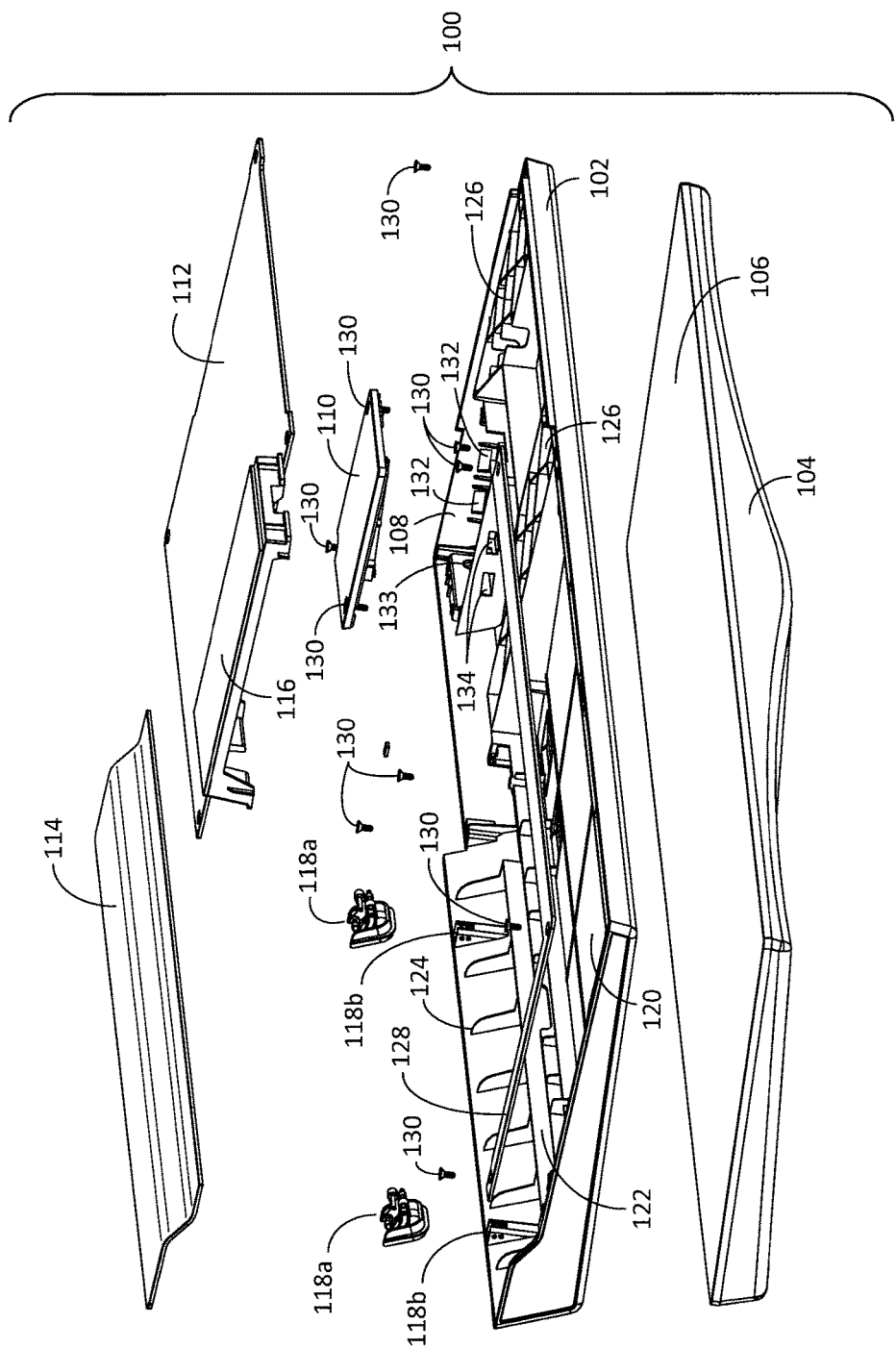
FIG. 2 illustrates a top-front-left perspective exploded view of the portable gaming control station, according to certain embodiments.

FIG. 2 illustrates a top-front-left perspective exploded view of the portable gaming control station, according to certain embodiments. Like reference numerals refer to corresponding parts throughout the figures (FIG. 1 to FIG. 5 herein) and such parts are previously described herein with respect to FIG. 1. FIG. 2 shows a clearer view of the convex shaped regions 104a of the underside support structure 104 of the portable gaming control station 100. Further, in FIG. 2, both sets of hinges (118a, 118b) associated with the hinged cover 114 are visible.

Figure 3:
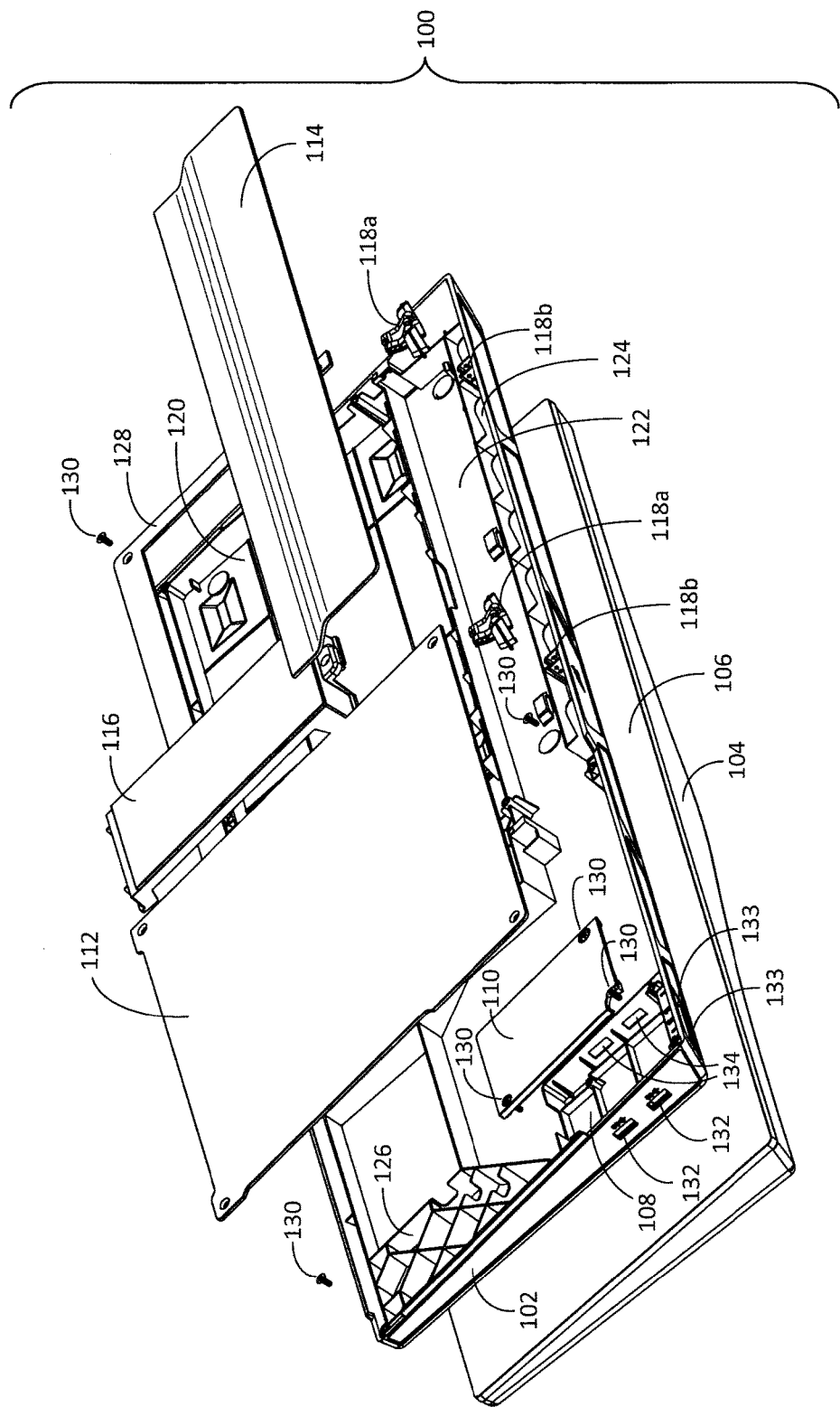
FIG. 3 illustrates a top-back-right perspective exploded view of the portable gaming control station, according to certain embodiments.

FIG. 3 illustrates a top-back-right perspective exploded view of the portable gaming control station, according to certain embodiments. FIG. 3 shows a clearer view of the cable storage compartment 122. Like reference numerals refer to corresponding parts described herein with reference to FIG. 1.

Figure 4:
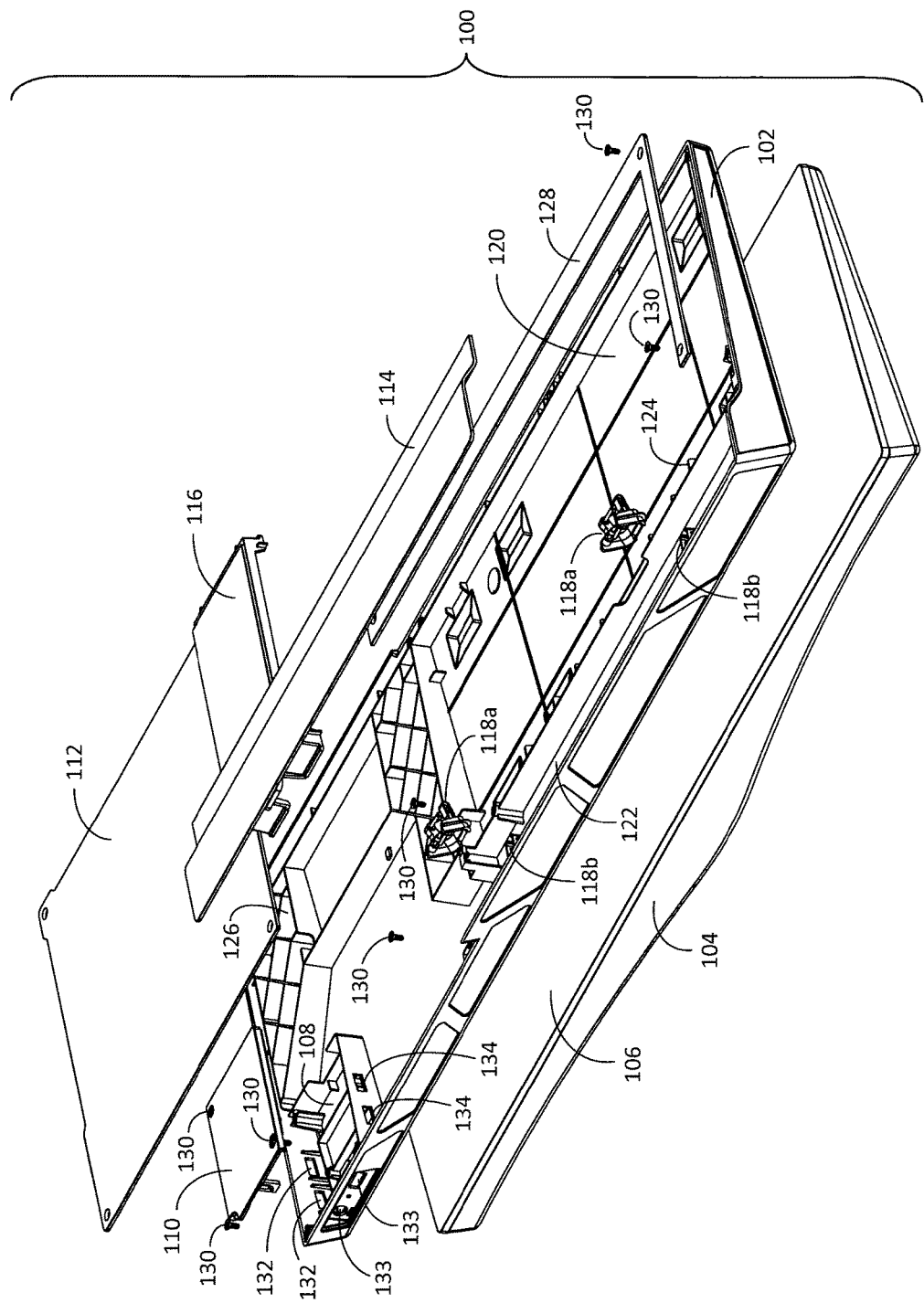
FIG. 4 illustrates a top-back-left perspective exploded view of the portable gaming control station, according to certain embodiments.

FIG. 4 illustrates a top-back-left perspective exploded view of the portable gaming control station, according to certain embodiments. FIG. 4 shows a clearer view of the battery and PCB compartment 108, the USB port openings 132, connector openings 133 and connector openings 134. Like reference numerals refer to corresponding parts described herein with reference to FIG. 1.

Figure 5:
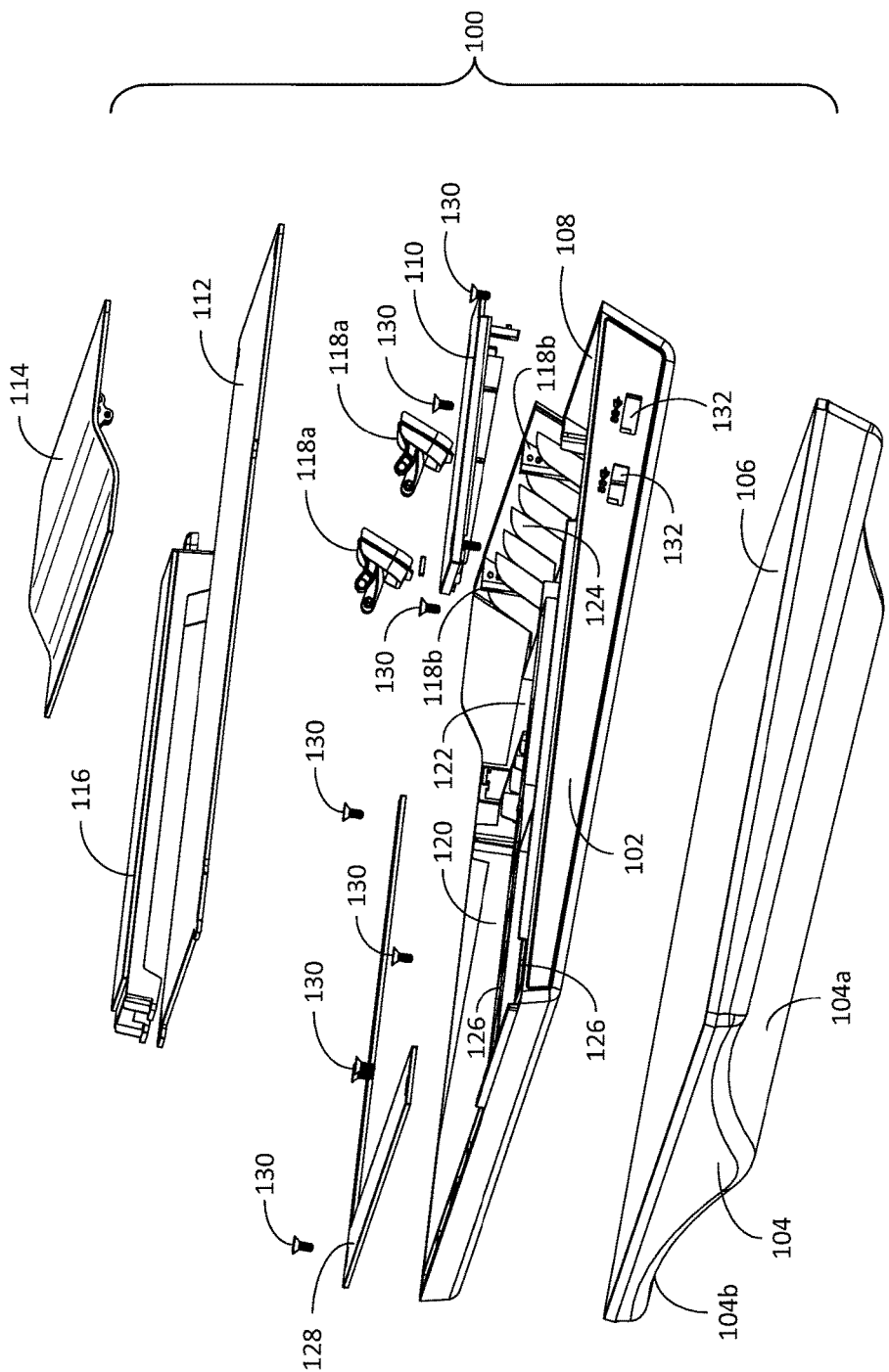
FIG. 5 illustrates a bottom-front-right perspective exploded view of the portable gaming control station, according to certain embodiments.

FIG. 5 illustrates a bottom-front-right perspective exploded view of the portable gaming control station, according to certain embodiments. FIG. 5 shows a clearer view of the underside support structure 104 with convex shaped regions 104a. Like reference numerals refer to corresponding parts described herein with reference to FIG. 1.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A portable computer gaming control station comprising:
   a tub;
   a tub mounting plate removably attached to a bottom of the tub;
   wherein the tub comprises:
   a keyboard compartment for holding a keyboard that is separate and distinct from the portable gaming station;
   a cable storage compartment;
   a printed circuit board (PCB) compartment; and
   a mouse plate removably attached to a top portion of the tub and laterally adjacent to the keyboard compartment and laterally adjacent to the cable storage compartment.

2. The portable computer gaming control station of claim 1, wherein the tub mounting plate includes an underside support structure that is removably attached to a bottom portion of the tub mounting plate.

3. The portable computer gaming control station of claim 2, wherein the underside support structure is ergonomically shaped to fit on a human lap.

4. The portable computer gaming control station of claim 1, wherein the keyboard compartment includes a detachable filler plate.

5. The portable computer gaming control station of claim 1, wherein the cable storage compartment includes a cover.

6. The portable computer gaming control station of claim 1, wherein the printed circuit board (PCB) compartment includes a plurality of USB port openings.

* * * * *